US008024266B1

(12) United States Patent
Barber

(10) Patent No.: US 8,024,266 B1
(45) Date of Patent: Sep. 20, 2011

(54) METHOD FOR SECURE, CLOSED-LOOP MONEY TRANSFER VIA ELECTRONIC MAIL

(75) Inventor: Timothy P. Barber, Boise, ID (US)

(73) Assignee: Kount Inc., Boise, ID (US)

( * ) Notice: Subject to any disclaimer, the term of this patent is extended or adjusted under 35 U.S.C. 154(b) by 2774 days.

(21) Appl. No.: 09/741,207

(22) Filed: Dec. 19, 2000

Related U.S. Application Data

(60) Provisional application No. 60/172,656, filed on Dec. 20, 1999.

(51) Int. Cl.
*G06Q 40/00* (2006.01)
(52) U.S. Cl. ............... 705/39; 705/51; 705/37; 709/206
(58) Field of Classification Search ............... 705/51, 705/39, 37; 709/206; 580/21
See application file for complete search history.

(56) References Cited

U.S. PATENT DOCUMENTS

| | | | | | |
|---|---|---|---|---|---|
| 5,771,289 A | * | 6/1998 | Kuzma | .......................... | 713/153 |
| 5,999,967 A | * | 12/1999 | Sundsted | ..................... | 709/206 |
| 6,145,079 A | * | 11/2000 | Mitty | ............................. | 713/170 |
| 6,189,097 B1 | * | 2/2001 | Tycksen | ........................ | 713/156 |
| 6,370,514 B1 | * | 4/2002 | Messner | ........................ | 705/14 |

OTHER PUBLICATIONS

Donal O'Mahony et al ., "Electronic Payment Systems", Artech House,Inc., (1997).*

* cited by examiner

*Primary Examiner* — Daniel Felten
(74) *Attorney, Agent, or Firm* — Fenwick & West LLP

(57) ABSTRACT

A method of providing for a money transfer over a network by providing a stamp having a face value and a lifespan both indicated on the stamp, the stamp being a string that is a concatenation of two or more fields including the face value and the lifespan, with at least one of the fields calculated according to a prescription involving a hashing or encryption of a concatenation of others of the fields or of some other field not part of the stamp; affixing the stamp to an e-mail; and allowing the recipient of the e-mail to obtain value for the stamp if the stamp is presented to a predetermined entity (such as a stamp issuer) for the stamp value within the lifespan indicated on the stamp.

8 Claims, 5 Drawing Sheets

METHOD FOR SECURE, CLOSED-LOOP MONEY TRANSFER VIA ELECTRONIC MAIL

This application claims the benefit of U.S. Provisional Application(s) No(s).: 60/172,656 Dec. 20, 1999.

FIELD OF THE INVENTION

The present invention relates to electronic mail (e-mail) sent via a network, such as the Internet. More particularly, the present invention relates to conveying via an e-mail a monetary value.

BACKGROUND OF THE INVENTION

An advertiser of goods or services who wishes to target advertising to individuals or organizations that are likely to be more interested in the offered goods or services than the public in general, can today take advantage of electronic mail, i.e. so called e-mail, to send to perspective buyers an advertisement via a computer network such as the Internet. In such an advertising strategy, an advertiser would obtain a mailing list providing e-mail addresses of individuals or organizations that for one or another reason would reasonably be thought to be interested in the goods or services being offered by the merchant. The advantage to an advertiser of such an advertising strategy is that the advertiser typically does not pay to send an e-mail, although in the case of the Internet, the advertiser does have to pay typically a monthly fee for access to the Internet. The disadvantage is that since sending an e-mail costs essentially nothing, many people or organizations have, at least in the past, used e-mail to send messages or advertising with little regard for the likelihood that the recipient of the e-mail would be interested in the e-mail message. Such indiscriminate, unsolicited e-mailing is sometimes referred to as spam. Because of span, many people decline to open and read unsolicited e-mail, in recognition of the simple fact that the sender did not have to weigh the cost of sending the e-mail compared to the likelihood that the e-mail would be somehow worthwhile.

What is needed is a protocol for sending e-mail messages that could be used for advertising or to convey any other kind of message in such a way that a receiver of the e-mail would believe that the e-mail is more likely than not worth opening and reading.

SUMMARY OF THE INVENTION

Accordingly, the present invention provides, a method of providing for a money transfer over a network, including the steps of: providing a stamp having a face value and a lifespan both indicated on the stamp, the stamp being a string that is a concatenation of two or more fields including the face value and the lifespan, with at least one of the fields calculated according to a prescription involving a hashing or encryption of a concatenation of others of the fields or of some other field not part of the stamp, the hashing or encryption being performed to for example enable discovery of counterfeiting or fraudulent altering of the stamp value or lifespan; affixing the stamp to an e-mail; and allowing the recipient of the e-mail to obtain value for the stamp if the stamp is presented to a predetermined entity (such as a stamp issuer) for the stamp value within the lifespan indicated on the stamp.

In a further aspect of the invention, the stamp is a concatenation of a set of fields, the set including: an issue time; a lifespan; a stamp value; and a first-hashed field that is a hash (and in some applications a truncated hash) of a concatenation of all of the preceding fields and, in addition a secret constant known only to the stamp issuer.

In a still further aspect of the invention, the set of fields of which the stamp is a concatenation further includes a second-hashed field that is a hash (and in some applications a truncated hash) of the issue time field, the lifespan field, the stamp value field, and the first-hashed field.

In yet a still further aspect of the invention, the set of fields of which the stamp is a concatenation further includes a digital signature field that is a digitally signed encryption of the issue time field, the first-hashed field and the second-hashed field, and the encryption is performed using a private key of the stamp issuer.

Thus, the present invention provides for attaching a digital "stamp" to an e-mail, a stamp that can be redeemed by the recipient for its indicated value. Such e-mail stamping is a way of discouraging spam, i.e. junk electronic advertising, because it enables a sender of electronic advertising to create for a recipient value in opening stamped advertising sent by e-mail. Over time, the inventor anticipates, promulgators of electronic advertising who are not willing to stamp their advertising will probably not bother sending advertising, because such advertisers will suppose that many consumers will not decline to open an e-mail unless it is stamped according to the present invention.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The present invention motivates the recipient of an unsolicited e-mail to open the e-mail and examine it, by electronically affixing a stamp to the e-mail, a stamp that the recipient can redeem for the value indicated on the stamp. The recipient of the stamped e-mail according to the invention will likely appreciate that the sender of the e-mail considers the information conveyed by the e-mail of sufficient value to pay in effect pay the recipient to read the e-mail. Such e-mail is to be contrasted with what is sometimes called spam, i.e. e-mail that is sent indiscriminately to many recipients without regard for the likelihood that the information conveyed by the e-mail would be of any interest to the recipient.

The stamp included with an e-mail is, as explained in more detail below, a character string calculated according to one or another algorithm, and appears in an e-mail as simply a concatenation of several fields separated by a delimiter (typically a vertical line, able to be typed using a conventional computer keyboard). For example, the sender of an e-mail might include in the e-mail a stamp worth a $1.50 USD if redeemed by the recipient within thirty (30) days. If the sender has an e-mail address of sen@hotmail.com, and the recipient has an e-mail address of rec@email.com, then such a stamp might be, for example: 37801e5d|30|150|sen@ hotmail.com|rec@email.com|67f0ca42|fa470eb2|14ae4569, the specific values of some of the fields (set off by the delimiter "|") depending on the details of the calculation of the stamp, as explained below. The recipient would then have thirty days to redeem the stamp and obtain the indicated stamp value of $1.50 USD, as explained below.

Figure 1:
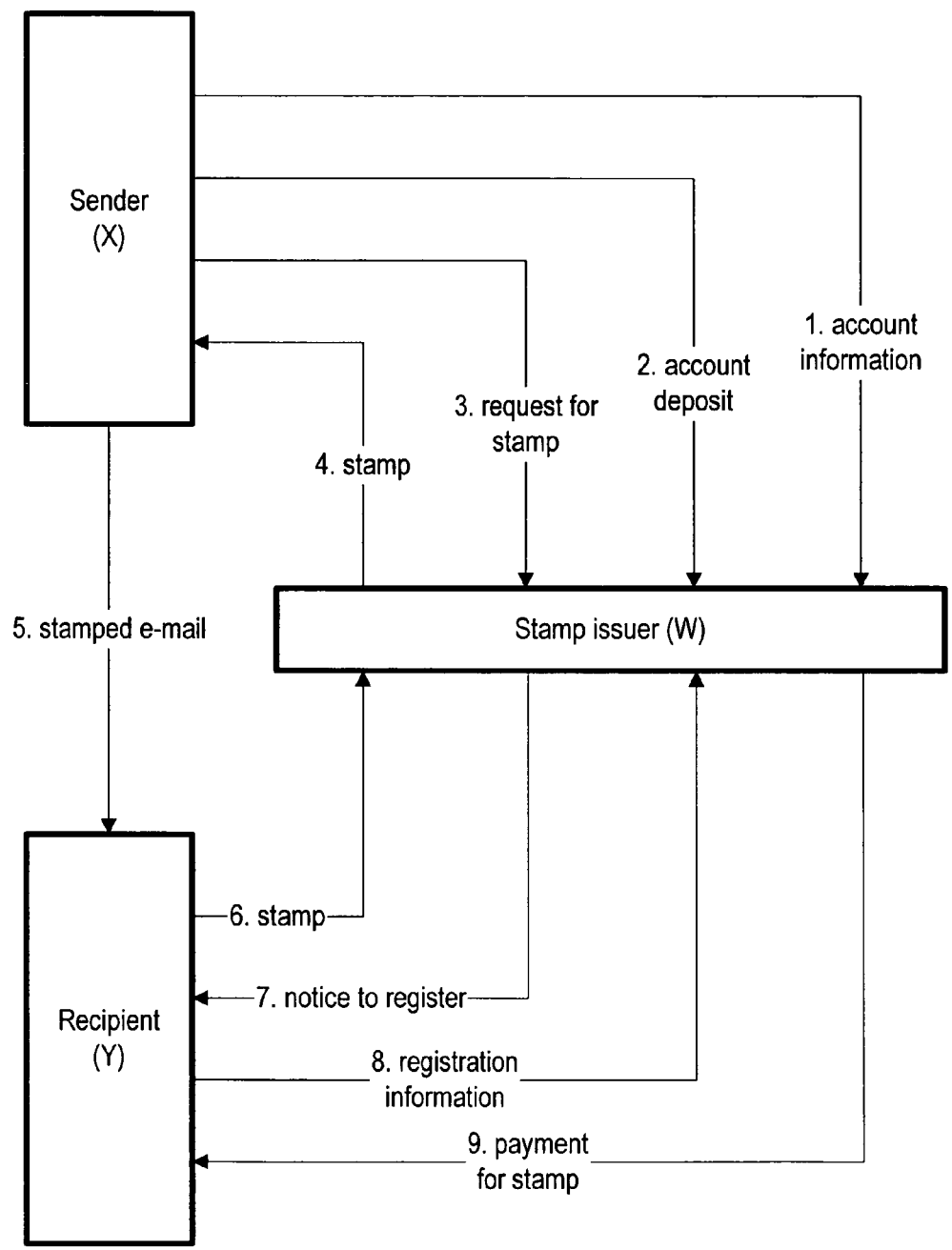
FIG. 1 is a block diagram/flow diagram showing the principal transactions in a system for sending stamped e-mail according to the invention.
Figure 2A:
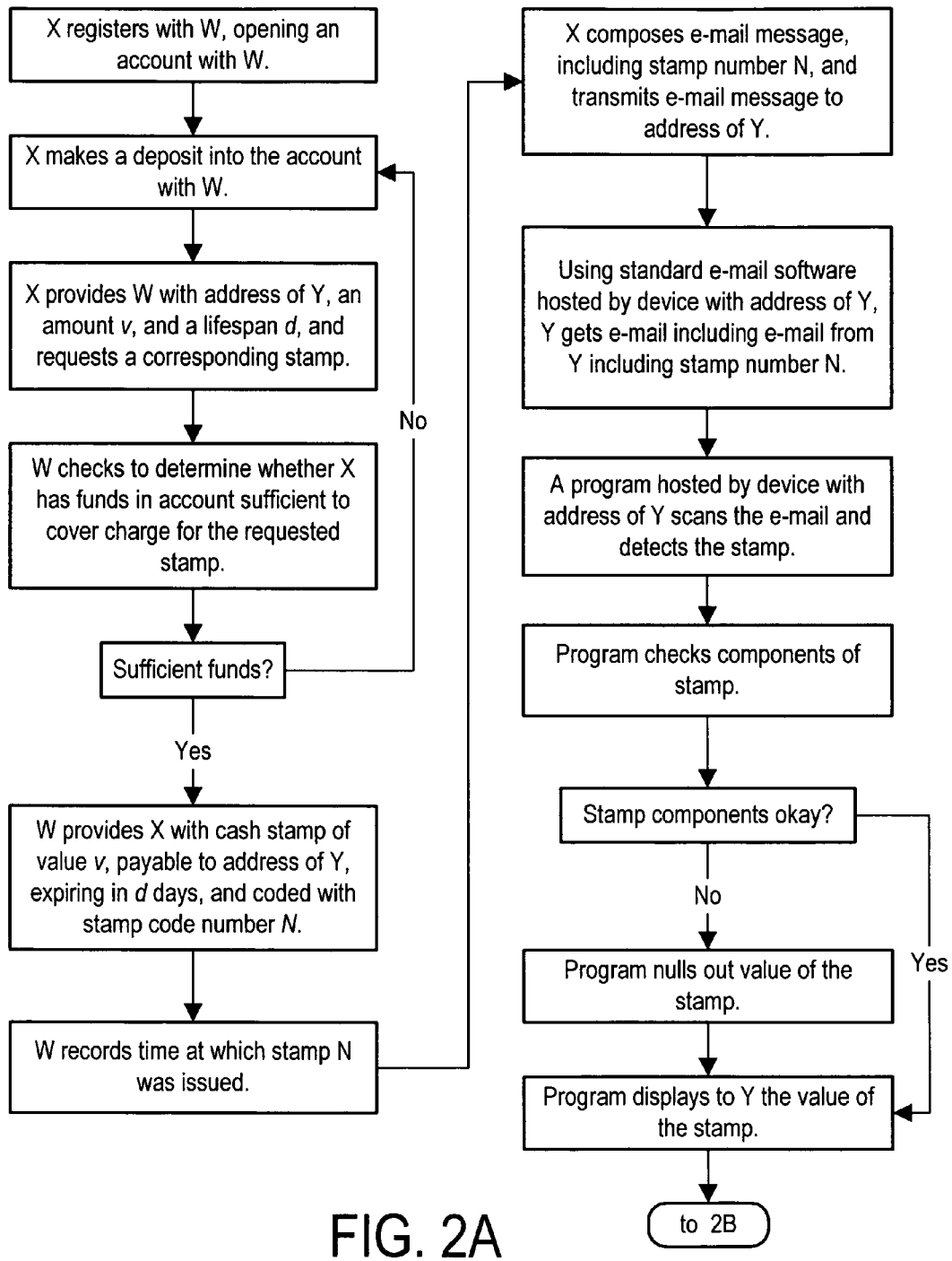
FIGS. 2A and 2B are in combination a flow chart of a protocol for sending an e-mail in such a way that the recipient is likely to examine the e-mail, the protocol calling for providing, with the e-mail, a stamp having some issued value that can be redeemed by the recipient.
Figure 2B:
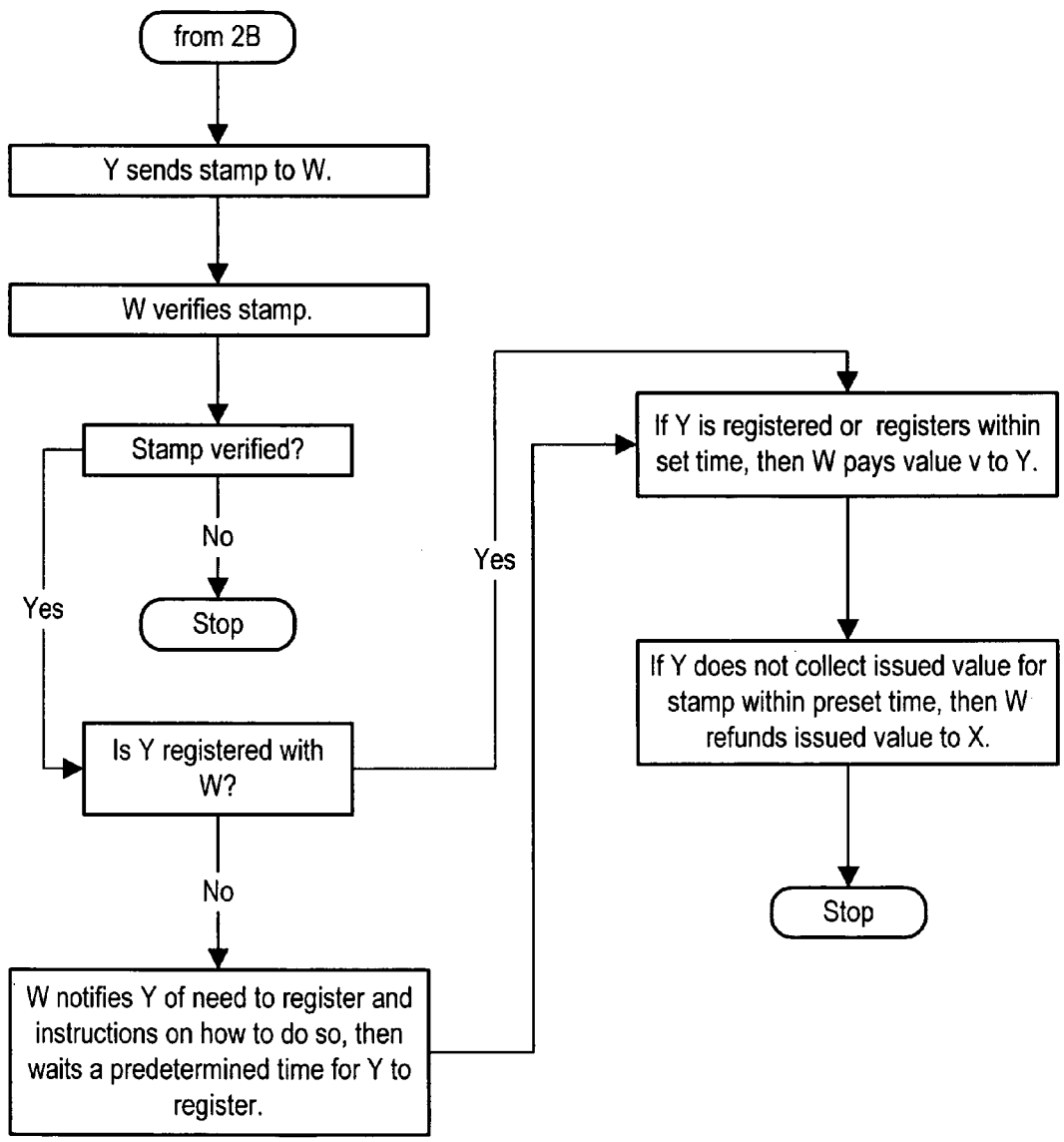

Referring now to FIG. 1 and FIGS. 2A and 2B, according to the invention, the sender of an e-mail, here labeled X, in order to send a stamped e-mail to a recipient, here labeled Y, first sets up an account with a stamp issuer, here labeled W. To set up an account with a stamp issuer, the sender provides account information to the stamp issuer, typically via e-mail, but also possibly by any other suitable means, such as a web browser, by telephone, or by regular mail. In addition, the sender makes a deposit with the stamp issuer of funds sufficient to provide for redemption of stamps the sender intends to use. The deposit can be made using various forms of payment such as check, credit card, or cash stamps, and can be made either over the Internet, or by telephone or by any other suitable means of communication.

Next the sender requests that the stamp issuer issue a stamp, for a specified amount and for a specified lifespan, to be used in sending an e-mail to a specified destination e-mail address (the address of the recipient, Y). In the preferred embodiment, lifespan is indicated as a number of days d, and the value of the stamp is indicated as a number of cents (hundredths of the U.S. dollar). Before issuing the requested stamp to the sender, the stamp issuer confirms that the sender's account has sufficient funds to cover the cost of issue of the requested stamp. In the preferred embodiment, the cost of issue of the stamp would exceed the cost of the stamp by some pre-agreed amount, an amount intended to cover fees charged by the issuer for providing the stamp issuing and redemption service. If the account balance is not sufficient to cover the cost of issue of the stamp, the stamp issuer notifies the sender, who would then have to make a further deposit. Once the sender account balance is adequate, the stamp issuer calculates the stamp, i.e., produces a stamp, here indicated as S. The stamp issuer then provides the stamp to the sender after recording the time when the stamp was issued. The stamp issuer then also deducts from the sender's account an amount sufficient to cover issue of the stamp.

Next, the sender affixes the stamp to the e-mail to be sent to the recipient. The stamp issuer, incidentally, is able to provide the stamp to the sender not only via e-mail, but by hypertext transfer protocol (http) over the Internet, or by regular mail. As indicated above, a stamp is simply a character string that can be typed or electronically pasted into an e-mail. The sender then transmits the e-mail bearing (including) the stamp to the recipient.

When the recipient receives the e-mail using one or another communication device (such as a personal computer or handheld device with access to the Internet), the recipient opens the e-mail using standard e-mail software hosted by the device. After receiving the e-mail, special stamp valuing software, developed in order to implement the invention, and also, preferably, hosted on the same device as the standard e-mail software, scans the e-mail and detects the stamp. The stamp detection software then checks various fields of the stamp to determine whether the stamp has the indicated value (since, for example, the stamp could be expired by the time a recipient retrieves the e-mail).

Figure 4:
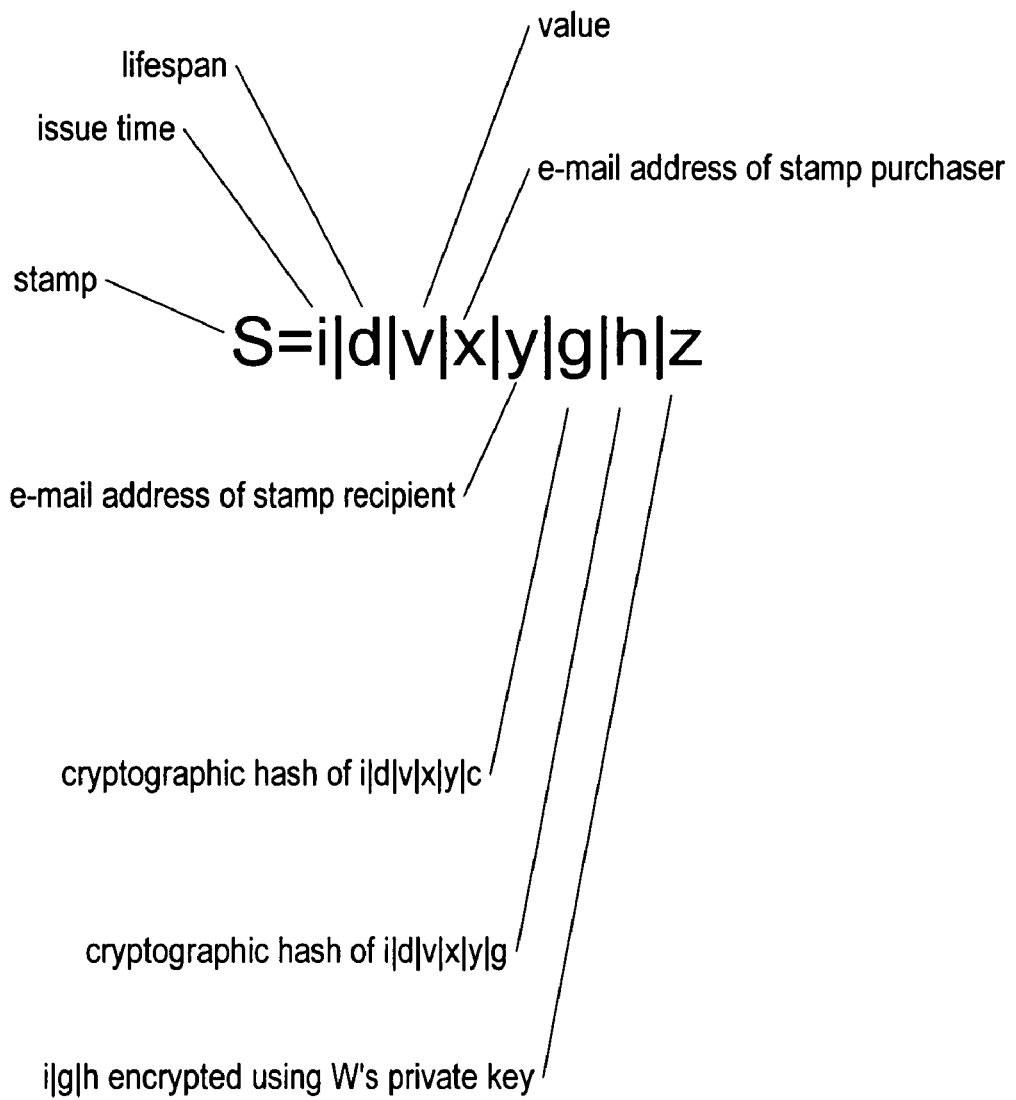
FIG. 4 is a depiction of a stamp showing the different values that are concatenated to form the stamp.

Referring now also to FIG. 4, a stamp is shown as the concatenation of several different fields, some of which are cryptographic hashes of others of the fields. In the preferred embodiment, the first field is the issue time i, which is preferably a standard unix time stamp—i.e., Greenwich mean time (GMT) seconds since Jan. 1, 1970—and is represented as eight (8) hexadecimal digits. The next field is the lifespan d, expressed in days, and is the number of days since the issue time after which the stamp will expire, i.e., it can no longer be redeemed; the lifespan is expressed as one or more decimal digits. The next field is the value of the stamp, in units of $0.01 USD, and is also expressed as one or more decimal digits. The next field is the e-mail address of the sender (or more generally the stamp buyer, who may or may not be the sender). Then follows the e-mail address of the recipient. The fields after the e-mail address of the recipient are all calculated fields in the preferred embodiment.

The next field, represented as g, is a cryptographic hash of the concatenated field i|d|v|x|y|c, i.e., a hash of all the preceding fields and, in addition, a secret constant c, known only to the stamp issuer, a constant that is preferably 32 or more hexadecimal digits, although 8 hexadecimal digits is often adequate. The g field is preferably the last eight (8) or more hexadecimal digits of the hash, but other lengths and truncations are of course comprehended by the invention.

A hash is a function that is (very) difficult to invert, i.e. is it essentially a one-way mapping. In the preferred embodiment, hashing is done using the so called secure hash algorithm one (SHA1), as specified in Federal Information Processing Standards publication (FIPS PUB) 180-1, dated Apr. 17, 1995, or any later version, but other hash algorithms are also advantageously used, such as the so called MD5 algorithm, including hash algorithms that are significantly less secure than SHA1, since the payoff for breaking the algorithm in the case of its application in the present invention is relatively insignificant, or at least can be made so by limiting the value of a stamp to a relatively low predetermined amount, say less than ten dollars. Alternatively, different hash algorithms can be used, depending on the value of the stamp. In such an embodiment, higher-valued stamps would be "minted" using more secure hash algorithms than SHA1.

After the g field is another hash field, represented by h; it is some or all of a cryptographic hash of all the earlier fields, including the g field, i.e. it is some or all of a cryptographic hash (preferably either using MD5, or SHA1) of i|d|v|x|y|g, and is preferably the last eight or more hexadecimal digits of the hash.

Finally, the stamp includes a z field, which is an encryption of the concatenated string i|g|h, preferably a digital signature, with the encryption being performed using a private key created by the stamp issuer.

In an alternative embodiment of the invention, the z field is the hash of the concatenation, i|g|h|p, where p is a constant known only to the stamp issuer and other qualified parties that relay or filter e-mail messages. (Such a hashing is a standard form of digital signature.) For example, suppose (the organization with the e-mail address of) hotmail.com is a qualified party and so knows p. If a recipient of an e-mail views the e-mail at hotmail.com, or uses hotmail.com to relay e-mail, then (the organization with the e-mail address of) hotmail.com could use p to validate stamps for the recipient. In such an embodiment, it would be sufficient to use a truncated version of hash of i|g|h|p, rather than the full output of the hash.

In checking a stamp, in the preferred embodiment, the stamp valuing software first checks the issue time and the lifespan to determine whether the stamp has expired, and if so, it sets the value of the stamp to zero (i.e., it nulls the stamp). Next, the software checks the recipient address field, and if the address does not correspond to the address of the device hosting the stamp valuing software, then the stamp valuing software nulls the stamp. (One reason for checking the recipient address is to guard against the possibility that some earlier recipient used the stamp again, to send out electronic advertising to some further recipient.)

The stamp valuing software next checks the h field, i.e. the hash of all of the fields in the stamp preceding the h field. (The checking of a hash field is performed by computing the hash according to a predetermined hash algorithm, and performing a predetermined truncation.) Finally, the stamp valuing software checks the z field, using the public key of the stamp issuer. In other words, the stamp valuing software decrypts the z field and compares the result with the concatenated field i|g|h. If decryption does not produce the concatenated field i|g|h, then the stamp valuing software nulls the value of the stamp. After completing either all of the checks or after checking until the stamp value is nulled, the stamp valuing software displays for the recipient either the issue (face) value of the stamp or, if the stamp was nulled, zero.

The invention also comprehends that instead of stamp valuing software being hosted by the device used by the recipient to receive an e-mail, such software is, instead, hosted by computing resources operated by a service, and the recipient of the stamp sends the stamp to the service which then determines the value of the stamp and indicates the value to the recipient. In such an embodiment, the recipient would, optionally, provide several stamps to the service, which would then provide a response table showing for each stamp, the sender, subject, time received and value.

Independent of what use a sender makes of a stamp issued to the sender, the stamp issuer routinely marks as expired any stamp that has not been redeemed within the lifespan of the stamp. In so doing, the stamp issuer refunds to the sender account the value of the stamp, less any pre-agreed on service fees.

If a stamp has a non-zero value when received by a recipient, in order to obtain the value for the stamp, the recipient will provide the stamp to the stamp issuer. The stamp can be conveyed to the stamp issuer via e-mail, or over the internet via http, or by even simply regular mail. The stamp issuer will then check the stamp to determine whether by the time the stamp issuer receives the stamp, the stamp is expired, in which case it will reject the stamp, or whether the stamp was in fact never actually issued (i.e. is counterfeit), in which case it will reject the stamp, or whether the stamp has already been redeemed once, in which case it will reject the stamp, or whether the stamp lacks a valid g field (which was a hash based on the secret constant known only the stamp issuer), and if it does not, the stamp issuer will reject the stamp.

The above checks by the stamp issuer are sufficient for many applications of the present invention. However, as a further integrity check, in the preferred embodiment, the stamp issuer also checks the h field, just as did the (recipient) stamp valuing software, and, finally, checks (using the private key of the stamp issuer) whether the z field has a valid signature. It rejects the stamp if it fails any of the checks.

If the stamp is not rejected, then the stamp issuer records that the stamp was redeemed, and records when the stamp was redeemed. However, the stamp issuer cannot pay the recipient for the stamp unless the recipient has registered with the stamp issuer, i.e. has provided the stamp issuer with information on how to pay the recipient. Thus, the stamp issuer determines whether the recipient is, in fact, registered, and if not sends a notice to the recipient of the need to register, indicating the information that is required for registration. If the recipient is not registered but wishes to obtain the value of the stamp from the stamp issuer, then the recipient provides the stamp issuer with the requested information, which includes instructions on how payment is to be made. In the preferred embodiment, if the stamp is redeemed but the recipient has not actually registered within the lifespan of the stamp, then the stamp issuer will indicate that the stamp is expired and will credit the sender account for the value of the stamp, less any service fees. Since a stamp can be digitally duplicated, only the copy of a stamp that is first provided for redemption is redeemed. The stamp issuer keeps track of whether a stamp has been redeemed (only until it would be too late to redeem the stamp), and as noted above, refuses to redeem a stamp that is provided too late for redemption.

Figure 3:
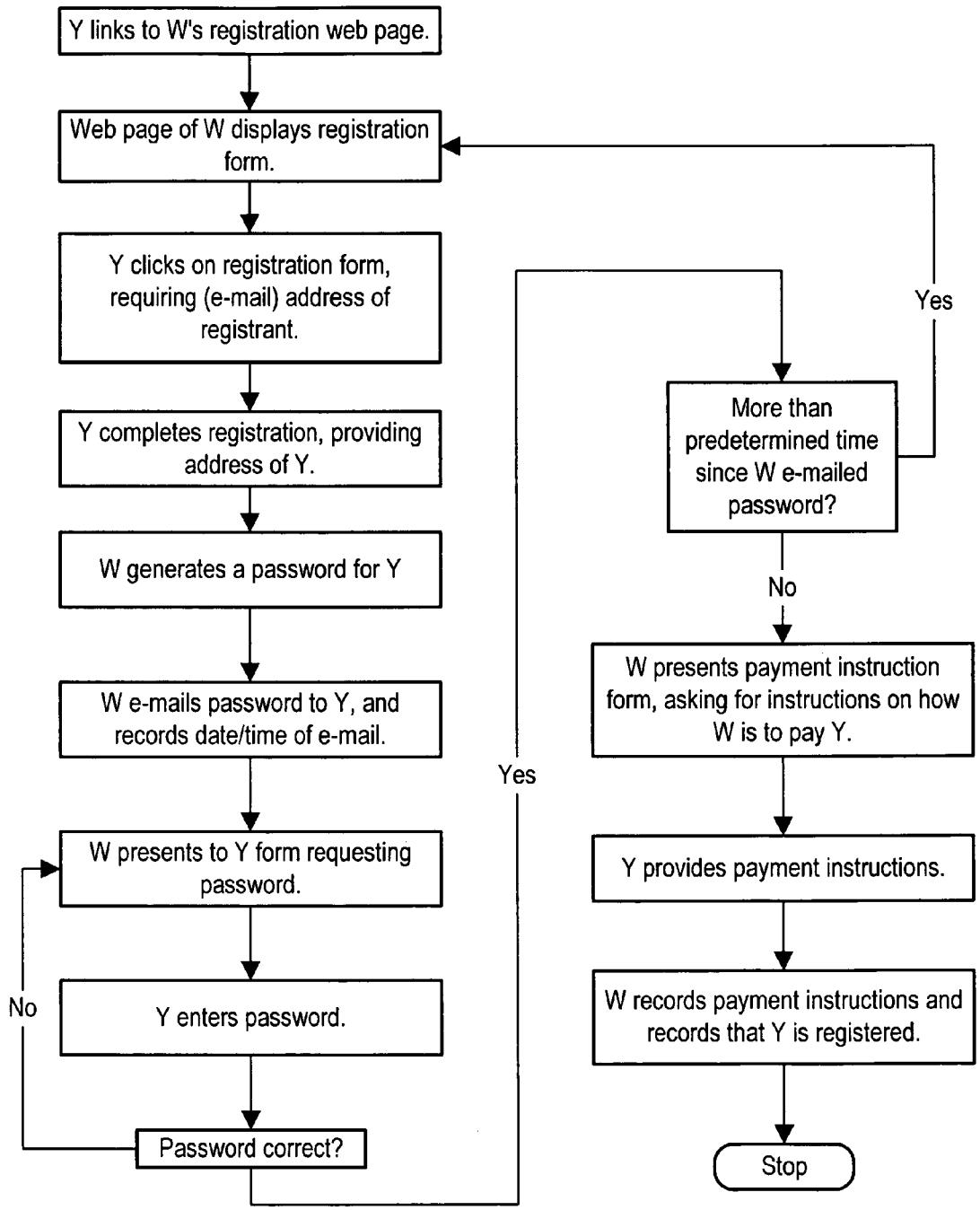
FIG. 3 is a flow chart indicating the steps that would be followed by the recipient of the stamped e-mail so that the recipient is able to convert the stamp to its corresponding value.

FIG. 3 shows the registration procedure in more detail. As shown, in the preferred embodiment, the recipient links to a registration web page of the stamp issuer, a page that displays a registration form. The recipient clicks on the registration form which requires the e-mail address of the registrant. The recipient completes the registration providing the requested e-mail address, and the stamp issuer then generates a password for the recipient. The stamp issuer then e-mails the password to the recipient, and records the time the password was sent to the recipient. When the recipient receives the e-mail, the recipient reads the e-mail, including the password, and notes the instructions to access the web site of the stamp issuer. The recipient does so, and is asked to enter the password assigned to the recipient. The recipient enters the password and the stamp issuer then compares the password with the password that was assigned, and also determines whether more than a predetermined amount of time has elapsed since the password was assigned to the recipient. If more than the predetermined amount of time has elapsed, then, in the preferred embodiment, the stamp issuer restarts the registration procedure (as an additional security precaution).

In an alternative embodiment of the invention, when the recipient receives from the stamp issuer the e-mail bearing the password to be assigned to the recipient, the recipient completes the registration procedure using e-mail instead of accessing the web site of the stamp issuer to complete the registration.

Assuming that the recipient enters the password within the predetermined time, the stamp issuer then presents a form requesting information from the recipient on how the stamp issuer is to pay the recipient. The information, for example, includes a bank account number, a credit card number for crediting a credit card, or an actual mailing address at which to receive a check. The recipient then enters the requested data and the stamp issuer records the data and records that the recipient is now registered.

The stamp coding according to the preferred embodiment as described above, makes it possible to remotely validate a stamp using the h and z fields, to fully validate the stamp if it is redeemed using the g, h, and z fields, to credit a redeemer (typically the recipient) even before the redeemer registers with the stamp issuer, and to block a variety of potential fraudulent misuses of the system. A stamp according to the invention is also short enough to easily fit in an http query string or an e-mail message header.

By allowing a stamp to expire (if not redeemed by a registered recipient within the lifespan of the stamp), the data storage overhead of the stamp issuer is kept to a manageable level; and counterfeiting is made more difficult because a counterfeiter has a relatively very limited time to determine how to manufacture counterfeits of a stamp. In addition, having a stamp expire allows a sender to offer incentives to a recipient that can be withdrawn if the recipient neglects to participate. Finally, of course, having a stamp expire simplifies accounting, since funds of a sender are not potentially owed to another forever.

The general principle is that X requests a stamp from W. W issues the stamp to X. Time elapses. If someone returns the stamp to W, then W credits and debits accordingly. If not, then the stamp eventually expires, and w credits and debits accordingly.

Although in the preferred embodiment, the e-mail addresses of a sender and recipient are encoded as part of a stamp, any sort of identification number could equally well be used, although if e-mail addresses are not used and some other form of identifier is used, then the registration information of a recipient and of a sender would have to tie the identifier to an e-mail address if the same checks of a stamp are to be made as in the preferred embodiment. Otherwise, changes would be made in the stamp-checking procedure to accommodate changing from e-mail addresses to some other identifier.

It is also comprehended by the invention that a sender could decide not to specify the recipient in advance, making the stamp a "wildcard stamp," i.e. a stamp that can be cashed in by the first redeemer. A system using wildcard stamps would of course be less secure than the preferred embodiment, but would likely be secure enough in cases where stamps have smaller values, such as less than $0.05 USD.

In some embodiments of the invention, the stamp issuer keeps track of (stores) only stamps that are redeemed (by a registered recipient) within the lifespan of the stamps, and purges the stamps after they expire. If an embodiment is such that the stamp issuer does not store all the stamps, the stamp issuer is then not aware of when a stamp has been issued. Therefore, in such an embodiment, the stamp issuer would put into a holding account funds sufficient to redeem each issued but not yet redeemed stamp, noting the time of deposit of the funds into the holding account, and would return the funds to the sender's account if the money was transferred into the holding account longer ago than the lifetime of a stamp, assuming all stamps have the same lifetime, or longer ago than the lifetime of a particular stamp, keeping track not only of when each deposit into the holding account was made, but also keeping track of the lifespan of the corresponding stamp.

As would be clear to one of ordinary skill in the art, the present invention can be used to facilitate the issue of money orders over the Internet, the stamp in the preferred embodiment playing the role of a money order. Thus, the sender of a money order provides funds to the money order issuer, who then issues a money order (calculated in the same way as a stamp is calculated, and so in fact the same kind of object as a stamp according to the preferred embodiment of the invention), which is then conveyed by e-mail to a recipient who redeems it for the value of the money order according to the protocol described above for redeeming a stamp.

It is to be understood that the above-described arrangements are only illustrative of the application of the principles of the present invention. For example, the stamp issuer could be one and the same with the sender. In addition the stamp value and lifetime, which are indicated on the stamp, need not be in human readable form (but in a form readable by the special stamp valuing software), and, in the case of the stamp value, what is indicated can include along with the stamp numerical value a code to indicate the currency in which the value of the stamp is given. Numerous other modifications and alternative arrangements may be devised by those skilled in the art without departing from the spirit and scope of the present invention, and the appended claims are intended to cover such modifications and arrangements.

What is claimed is:

1. A method of providing for a money transfer over a network, comprising steps in which:
    a) a stamp issuer provides to a sender a stamp having a face value and a lifespan both indicated on the stamp, the stamp being a string that is a concatenation of two or more fields including the face value and the lifespan, with at least one of the fields calculated according to a prescription involving a hashing or encryption of a concatenation of others of the fields or of some other field not part of the stamp;
    b) the sender affixes the stamp to an e-mail and sends the e-mail to a recipient; and
    c) the recipient of the e-mail redeems the stamp for the face value by presenting the stamp to a predetermined entity;
        wherein the predetermined entity provides the face value to the recipient only if the stamp is presented to the predetermined entity within the lifespan indicated on the stamp.

2. A method as in claim 1, wherein the stamp is a concatenation of a set of fields, the set comprising:
    a) an issue time;
    b) a lifespan;
    c) a stamp value; and
    d) a first-hashed field that is a hash of a concatenation of all of the preceding fields and, in addition a secret constant known only to the stamp issuer.

3. A method as in claim 2, wherein the first-hashed field is a predetermined truncation of the output of the hash of the concatenation of all of the preceding fields and, in addition a secret constant known only to the stamp issuer.

4. A method as in claim 2, wherein the set of fields of which the stamp is a concatenation further comprises a second-hashed field that is a hash of the issue time field, the lifespan field, the stamp value field, and the first-hashed field.

5. A method as in claim 4, wherein the second-hashed field is a predetermined truncation of the output of the hash of the issue time field, the lifespan field, the stamp value field, and the first-hashed field.

6. A method as in claim 4, wherein the set of fields of which the stamp is a concatenation further comprises a digital signature field that is a digitally signed encryption of the issue time field, the first-hashed field and the second-hashed field, wherein the encryption is performed using a private key of the stamp issuer.

7. A method as in claim 4, wherein the set of fields of which the stamp is a concatenation further comprises a digital signature field that is a pre-determined truncation of the issue time field, the first-hashed field, the second-hashed field, and a secret constant, known only to the stamp issuer and other qualified parties.

8. A method as in claim 1, wherein the predetermined entity is the stamp issuer.

* * * * *